(12) United States Patent
Neitzel et al.

(10) Patent No.: US 8,887,242 B2
(45) Date of Patent: Nov. 11, 2014

(54) METHODS AND APPARATUS TO PROVIDE LAYERED SECURITY FOR INTERFACE ACCESS CONTROL

(75) Inventors: Lee Allen Neitzel, Austin, TX (US); Dan Halver Ussing, Jr., Georgetown, TX (US); Robert Kent Huba, Georgetown, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1030 days.

(21) Appl. No.: 12/637,439

(22) Filed: Dec. 14, 2009

(65) Prior Publication Data

US 2010/0263025 A1    Oct. 14, 2010

Related U.S. Application Data

(60) Provisional application No. 61/169,199, filed on Apr. 14, 2009.

(51) Int. Cl.
*H04L 29/06* (2006.01)

(52) U.S. Cl.
CPC .................................. *H04L 63/105* (2013.01)
USPC ............................................................ 726/4

(58) Field of Classification Search
CPC . H04L 12/1822; H04L 65/1083; H04L 12/28; H04L 63/101; H04L 29/06027; H04L 29/06; H04L 29/12594; H04L 61/106; H04L 61/30; H04L 63/10; H04L 63/0428; H04L 12/5695; H04L 63/0218; H04W 28/16
See application file for complete search history.

(56) References Cited

U.S. PATENT DOCUMENTS

| 5,764,915 A | 6/1998 | Heimsoth et al. |
| 5,978,850 A | 11/1999 | Ramachandran et al. |

(Continued)

FOREIGN PATENT DOCUMENTS

| EP | 2242230 | 10/2010 |
| GB | 2399192 | 9/2004 |

(Continued)

OTHER PUBLICATIONS

"Search Report under Section 12(5)," issued by the Intellectual Property Office of Great Britain in connection with Great Britain Application No. GB1005809.7, on Jul. 23, 2010, 3 pages.

(Continued)

*Primary Examiner* — Michael R Vaughan
(74) *Attorney, Agent, or Firm* — Hanley, Flight & Zimmerman, LLC

(57) ABSTRACT

Example methods and apparatus to provide layered security for interface access control are disclosed. A disclosed example method includes receiving a connect message in a first server from a client application to access at least one server endpoint, in response to receiving the connect message, opening a session between the at least one server endpoint and the client application if the session is authorized to be opened, receiving a request from the client application to open an endpoint that provides at least one of read access, write access, or subscribe access to at least one resource, opening the endpoint within the open session after determining that the client application is authorized to access the at least one resource via the endpoint, receiving a request from the client application to assign a selection of the at least one authorized resource to the endpoint, assigning the at least one selected resource to the endpoint, and granting the client application access to the at least one resource via the endpoint.

33 Claims, 6 Drawing Sheets

(56) References Cited

U.S. PATENT DOCUMENTS

| | | | |
|---|---|---|---|
| 6,715,082 B1 | 3/2004 | Chang et al. | |
| 6,850,979 B1 | 2/2005 | Saulpaugh et al. | |
| 7,761,551 B2* | 7/2010 | Thieringer | 709/223 |
| 7,950,045 B2* | 5/2011 | Bogineni et al. | 726/3 |
| 7,984,096 B2* | 7/2011 | Beoughter et al. | 709/203 |
| 8,141,143 B2* | 3/2012 | Lee | 726/12 |
| 8,225,398 B2* | 7/2012 | Durie | 726/22 |
| 2001/0025311 A1* | 9/2001 | Arai et al. | 709/225 |
| 2004/0025052 A1* | 2/2004 | Dickenson | 713/201 |
| 2007/0143827 A1 | 6/2007 | Nicodemus et al. | |
| 2007/0150722 A1* | 6/2007 | Aaron et al. | 713/155 |
| 2008/0021917 A1* | 1/2008 | Baker et al. | 707/102 |
| 2008/0301794 A1 | 12/2008 | Lee | |
| 2012/0054273 A1* | 3/2012 | Peterson et al. | 709/203 |
| 2013/0198517 A1* | 8/2013 | Mazzarella | 713/168 |

FOREIGN PATENT DOCUMENTS

| | | |
|---|---|---|
| JP | 2002366415 | 12/2002 |
| JP | 2003023676 | 1/2003 |
| JP | 2003140704 | 5/2003 |
| JP | 2003186764 | 7/2003 |
| JP | 2004127172 | 4/2004 |
| JP | 2004531914 | 10/2004 |
| JP | 2007520797 | 7/2007 |
| JP | 2007323340 | 12/2007 |
| JP | 2008083906 | 4/2008 |
| WO | 0244858 | 6/2002 |

OTHER PUBLICATIONS

European Patent Office, "Search Report," issued in connection with European application serial No. 10 159 915.7, issued Feb. 2, 2012, 6 pages.

State Intellectual Property Office of the People's Republic of China, "The Notification of the First Office Action," issued in connection with Application No. 201010151782.20, Nov. 27, 2013, 7 pages.

Japanese Patent Office, "Notice of Reasons for Rejection," issued in connection with Japanese Patent Application No. 2010-092131, issued Apr. 1, 2014, 5 pages.

Great Britain Intellectual Property Office, "Examination Report under Section 18(3)," issued in connection with Patent Application No. GB1005809.7, issued May 7, 2014, 3 pages.

State Intellectual Property Office of the People'S Republic of China, English version of "Second Office Action," issued in connection with Chinese Patent Application No. 201010151782.0, issued on Jul. 18, 2014, 7 pages.

Japanese Patent Office, English version of "Decision of Refusal," issued in connection with Japanese Patent Application No. 2010-092131, mailed on Jul. 29, 2014, 3 pages.

* cited by examiner

METHODS AND APPARATUS TO PROVIDE LAYERED SECURITY FOR INTERFACE ACCESS CONTROL

RELATED APPLICATION

This application claims the benefit of U.S. Provisional Application No. 61/169,199, filed Apr. 14, 2009, the entirety of which is incorporated by reference.

FIELD OF THE DISCLOSURE

The present disclosure relates generally to data systems and, more particularly, to methods and apparatus to provide layered security for interface access control.

BACKGROUND

Data systems such as process control systems, manufacturing automation systems, and other industrial systems like those used in chemical, petroleum or other processes, typically include one or more centralized process controllers communicatively coupled to at least one host, operator, and/or user workstation and to one or more field devices via analog, digital or combined analog/digital buses. These systems utilize access control to grant access to the system based on the identity of a user. Access control techniques typically include user authentication, encryption, and/or user-specific access control lists. An access control list identifies which system resources can be read, written, executed, etc. Additionally, an access control list may identify which resources of a system a user can access (e.g., read, write, and/or execute). These resources may include, for example, data, alarms, events, and/or functions. Typically, system procedures, functions, and/or processes are organized into endpoints based on a type of resource being accessed. For example, there are separate endpoints for accessing current values of data, alarms, and events. There may also be separate endpoints for accessing historical values of data, alarms and events.

Data systems or process control systems may, by design, be isolated from outside network communications by having no physical and/or wireless connectivity to routers, servers, switches, and/or workstations that may be connected to the Internet and/or one or more intranets. Other data systems or process control systems may intentionally include connectivity to the Internet and/or one or more intranets to allow remote monitoring systems to monitor progress, quality, and/or control operations of a process. Additionally, external connectivity of the data system or the process control system to outside networks permits individual components of the control system to receive periodic and/or scheduled updates such as firmware updates or modified control routines. Although external connectivity of one or more systems may allow for external monitoring and control, such external connectivity may increase the threat of network intrusion to the system.

SUMMARY

Example methods and apparatus to provide layered security for interface access control are described. In one example, a method includes receiving a connect message in a first server from a client application to access at least one server endpoint and in response to receiving the connect message, opening a session between the at least one server endpoint and the client application if the session is authorized to be opened. The example method further includes receiving a request from the client application to open an endpoint that provides at least one of read access, write access, or subscribe access to at least one resource, opening the endpoint within the open session after determining that the client application is authorized to access the at least one resource via the endpoint, and receiving a request from the client application to assign a selection of the at least one authorized resource to the endpoint. Additionally, the example method includes assigning the at least one selected resource to the endpoint and granting the client application access to the at least one resource via the endpoint.

An example apparatus includes a first server programmed to receive a connect message from a client application to access at least one server endpoint and in response to receiving the connect message, open a session between the at least one server endpoint and the client application if the session is authorized to be opened. The example apparatus is also to receive a request from the client application to open an endpoint that provides at least one of read access, write access, or subscribe access to at least one resource and open the endpoint within the open session after determining that the client application is authorized to access the at least one resource via the endpoint. Further, the example apparatus is to receive a request from the client application to assign a selection of the at least one authorized resource to the endpoint, assign the at least one selected resource to the endpoint, and grant the client application access to the at least one resource via the endpoint.

DETAILED DESCRIPTION

Figure 1:
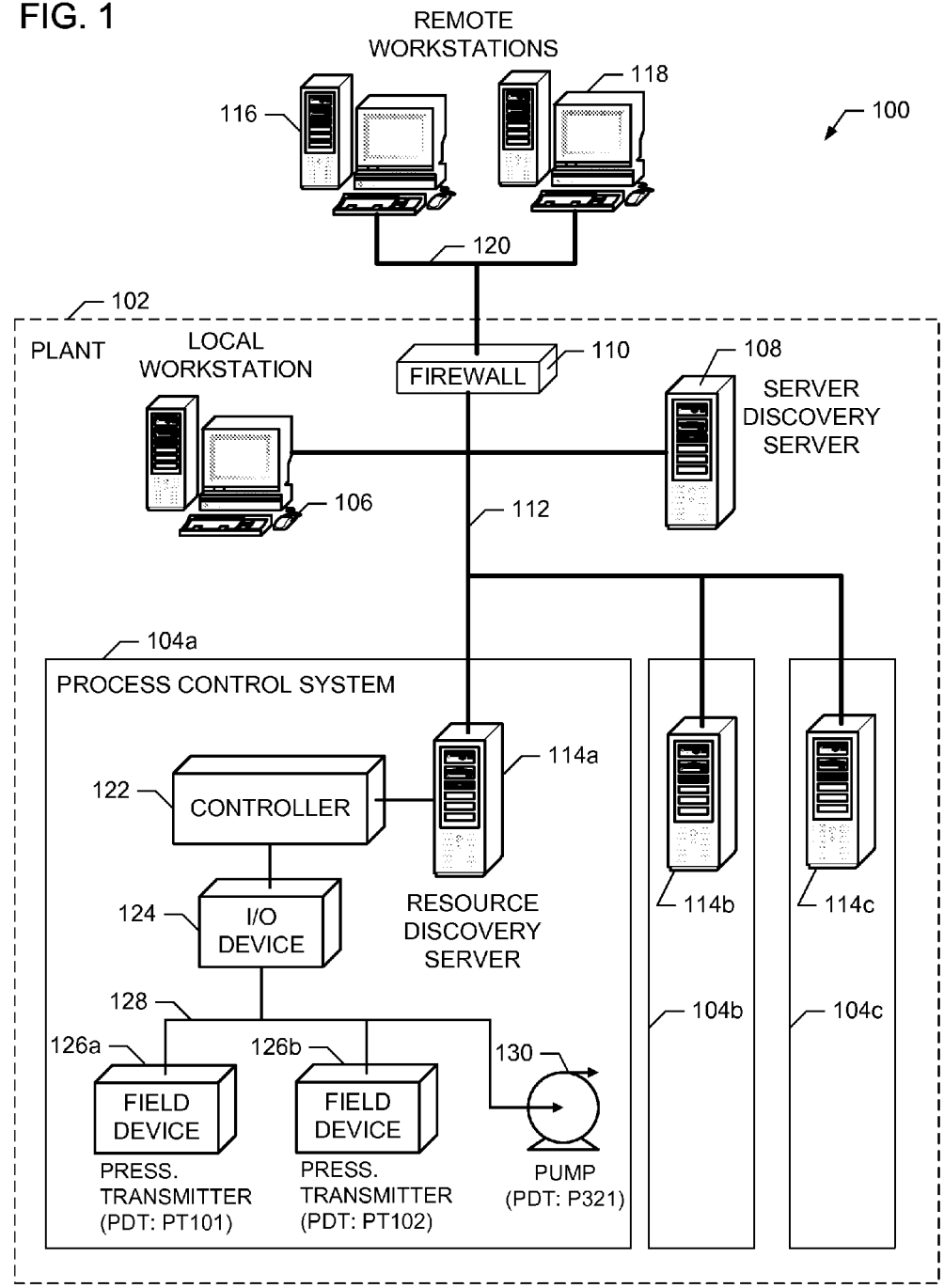
FIG. 1 is a block diagram of an example process control environment.

Although the following describes example methods and apparatus including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

Access control to systems is typically based on the identity of a user. Access control techniques typically include user authentication, encryption, and/or user-specific access control lists. An access control list identifies which system resources can be read, written, executed, etc. Additionally, an access control list may identify which resources of a system, such as functions, data, alarms, and/or events, a user can access (e.g., read, write, and/or execute).

Endpoints provide one or more access points to a system and/or service. A client application sends messages to the endpoints of the system and/or service to access resources associated with the system and/or service. An endpoint includes an address, a binding element, and/or a contract element. The address of the endpoint is a location that an application hosting a service uses to advertise the service. For example, an address may include a uniform resource locator (URL) containing the name of a directory that includes the service and the name of a file associated with that service as an endpoint. The binding element specifies a transport mechanism and/or a protocol that may be used to access a service. For example, a binding element may specify basic HttpBinding as the protocol for accessing a service. The contract element indicates operations that may be accessed within a service and/or parameters required to access resources accessible through an endpoint.

Endpoints may be implemented via object-oriented techniques, representational state transfer (REST)-based interfaces, and/or service-contract interfaces. Typically, procedures, functions, and/or processes are organized into endpoints based on a type of resource being accessed. For example, there are separate endpoints for accessing current values of data, alarms, or events and/or historical values of data, alarms or events.

Currently, there are a growing number of threats to endpoints. Threats include viruses, Trojans, worms, distributed denial of service (DDoS) attacks, and/or spyware. These threats may enable unauthorized third parties to view, manipulate, and/or corrupt data within a process control system. A system may be disrupted by a threat that can reduce productivity, efficiency, and/or revenue generated by the system.

Traditionally, endpoints are secured using security mechanisms that are independent of the resources being protected. These security mechanisms include user authentication, authorization, and/or encryption. For example, to secure an endpoint that provides access to current data values, the user may be authenticated and then allowed to read or write specific data based on access control lists. Additionally, encryption may be used to protect the confidentiality of the data being accessed. This typical approach requires all operations supported by the endpoint to use the same security mechanisms. For example, if authentication is used as a security mechanism, the authentication is implemented on each message exchange. Similarly, if encryption is used as a security mechanism, the encryption is implemented for each message transfer. However, the performance penalties associated with these security mechanisms often result in operators and/or users of the system turning off or otherwise disabling the security mechanism(s), thereby, leaving the endpoint open and vulnerable.

The example methods and apparatus described herein implement endpoints that are defined and organized by their security requirements. For example, endpoints typically defined to provide access to data, may be re-organized into separate read access endpoints, write access endpoints, and/or subscribe access endpoints. The read, subscribe, and/or write endpoints may be used for the retrieval and/or updating of data, alarms, events, etc. The read endpoint provides a client application with one or more methods (e.g., functions) to retrieve (e.g., read, get, etc.) data, alarms, and/or events within a server. The subscribe endpoint provides a client application with one or more methods (e.g., poll, callback, etc.) to periodically retrieve data changes, alarms, and/or events within a server. The write endpoint provides a client application with one or more methods to change (e.g., write, put, update, modify, acknowledge, execute, etc.) a value or state of data, alarms, events, and/or functions within a server.

The example methods and apparatus described herein implement access controls to endpoints based on security criteria that includes the identity and/or role of the requester, the location of the requester, the identity of the workstation and/or computer used by the requester, the network address of the requesting workstation and/or computer, the identity and/or type of a requesting application, protocols used by the requesting application to access the endpoint, and/or a time that a request was received by the endpoint. The endpoint access controls may authenticate and/or authorize request messages so that the request message may be processed by a receiving endpoint. Additionally, the endpoint access controls authorize contents of a list to be provided to a requesting client application, operator, and/or user. These contents may include resources associated with a resource discovery endpoint and/or resource discovery servers associated with a resource discovery endpoint. In some examples, the endpoint access control may send a security verification message to a requesting client application and/or workstation to verify the identity of the client application and/or the workstation. In other examples, the endpoint access control may send a security message to a third party computer (e.g., a Windows Active Directory Server) to obtain security information about the requestor.

The example methods and apparatus described herein provide layered security through a server discovery server and/or one or more resource discovery servers. The server discovery server locates resource discovery servers. Additionally, the server discovery server maintains a list of resource discovery servers and may use access control criteria to determine which requesters have access to each resource discovery server. The server discovery server lists the resource discovery servers that a requester (e.g., a client, an operator, etc.) may select to access resources associated with the resource discovery server. Each resource discovery server may be accessed via a corresponding resource discovery endpoint. The server discovery server may provide resource discovery endpoints to the requestor or, alternatively, the server discovery server may provide an endpoint within each resource discovery server that provides resource discovery endpoints to the requestor.

Upon a requester accessing a resource discovery endpoint, the resource discovery server determines which resources are available to the requester and lists those resources and/or the endpoints to those resources. The resource discovery server may use the access control criteria used to access the endpoint to determine which resources the requester may access. A requester may then select one or more of the available resources by registering to read, write, subscribe, and/or execute the resource(s). The resource discovery server then grants the register request(s) by allowing the requester access to the resource(s) through read, write, and/or subscribe endpoints that may be created, opened, and/or associated with the resource(s) selected by the requestor.

The methods and apparatus described herein restrict resources from being accessed via a resource discovery endpoint. The resources may be discovered and registered for access through a resource discovery endpoint. The resource discovery server provides the requester information necessary to open and/or create read, write and/or subscribe endpoints and to assign registered resource(s) to the read, write, and/or subscribe endpoints to access the registered resource(s). When the requester has assigned a resource to a read and/or subscribe endpoint, the requester may view data associated with that resource. Additionally, when the requester has assigned a resource to a write endpoint, the requestor may write data to that resource, or otherwise modify or execute the resource based on the functions available through the write endpoint. In some examples, the read, write, and/or subscribe endpoints may be created upon the requester selecting desired resources. In other examples, the read, write, and/or subscribe endpoints may be created and/or pre-configured by a server and opened by the requester.

The example methods and apparatus enable a requester to use the read, write, and/or subscribe endpoints associated with the resource discovery endpoint until the requester terminates a session with the resource discovery endpoint. After the requester terminates the session, the read, write, and/or subscribe endpoints created and/or opened within the context of the session are deleted from the session in addition to unintelligible identifiers associated with the selected resources. The requester may subsequently access the resource discovery servers to create new sessions to access resources.

The example methods and apparatus described herein utilize unintelligible dynamically assigned identifiers to alias selected resources and their associated read, write, and/or subscribe endpoints. This aliasing provides a different identifier for each read endpoint, write endpoint, subscribe endpoint, and/or resource accessible through the read, write, and/or subscribe endpoint. The requester and/or the resource discovery server use the identifiers to access endpoints to view and/or update data associated with selected resources. A resource identifier is created during the registration of the resources and an endpoint identifier is created during the opening and/or creation of an endpoint. Additionally, the identifiers (e.g., the resource identifier and/or the endpoint identifier) may not be used to identify a resource outside of the context of a session and/or a corresponding read, write and/or subscribe endpoint. The unintelligible identifiers used to identify resources and/or endpoints make it more difficult for snooping and/or sniffing applications to associate data values with the associated resources during communication between an operator and/or user and the system. Thus, these unintelligible identifiers make it more difficult for snooping and/or sniffing applications to cause security breaches. For example, a third party intercepting a message with an identifier will not recognize which resource is being identified and/or how to interpret the data value being transferred.

Additionally, unintelligible identifier security may be enhanced by renewing the unintelligible identifiers after a time period. The renewal of identifiers enables operators, users, and/or client applications to update unintelligible identifiers associated with resources periodically to inhibit traffic analysis that may be conducted by snooping and/or sniffing applications. Furthermore, server discovery endpoints and/or the resource discovery endpoints may use encryption in communications with the requester to prevent disclosure of the resources and/or the unintelligible identifiers associated with each resource.

FIG. 1 is a block diagram of an example process control environment 100 that may be used to implement the example methods and apparatus described herein. The process control environment 100 includes a process control plant 102 with three process control systems 104a-c. In other examples, the process control plant 102 may include fewer process control systems or additional process control systems. Additionally, the process control plant 102 includes a local workstation 106 that is communicatively coupled to a server discovery server 108 via a Local Area Network (LAN) 112. In other examples, the process control plant 102 may include additional local workstations, servers, and/or computers.

The example process control plant 102 represents an example plant that may produce one or more products during one or more batch processes and/or batch phases. In other examples, the process control plant 102 may include a power generation facility, an industrial facility, and/or any other facility type that includes control and monitoring systems or information technology systems. The example local workstation 106 may serve as an operator and/or user interface for the plant 102 and may be communicatively connected to one or more of the process control systems 104a-c via the LAN 112.

The example process control environment 100 includes remote workstations 116 and 118 coupled to the process control plant 102 via a Wide Area Network (WAN) 120. The WAN 120 may include any type of public switched telephone network (PSTN) system(s), public land-mobile network (PLMN) system(s), wireless distribution system(s), wired or cable distribution system(s), coaxial cable distribution system(s), fiber-to-the-home network(s), fiber-to-the-curb network(s), fiber-to-the-pedestal network(s), fiber-to-the-vault network(s), fiber-to-the-neighborhood network(s), Ultra High Frequency (UHF)/Very High Frequency (VHF) radio frequency system(s), satellite or other extra-terrestrial system(s), cellular distribution system(s), power-line broadcast system(s), and/or combinations and/or hybrids of these devices, systems and/or networks.

Additionally, the process control plant 102 includes a firewall 110 to determine, based on one or more rules, whether communication from the remote workstations 116 and 118 is to be permitted into the process control plant 102. The example remote workstations 116 and 118 may provide operators and/or users that are not within the process control plant 102 access to resources within the process control plant 102. For example, a process control engineer located in the United States may use the remote workstation 116 to check the status of a manufacturing line (e.g., a resource) within the process control plant 102 located in Mexico. In other example implementations, a firewall may be located between each of the process control systems 104a-c and the workstations 106, 116, and/or 118.

The example workstations 106, 116, and/or 118 may be configured to perform operations associated with one or more information technology applications, user-interactive applications, and/or communication applications. Additionally, the workstations 106, 116, and/or 118 may include any computing device including a personal computer, a laptop, a server, a controller, a personal digital assistant (PDA), a micro computer, etc.

The example resource discovery servers 114a-c may be configured to perform operations associated with one or more applications, user-interactive applications, communication applications, and/or one or more function blocks within the associated process control systems 104a-c. For example, the resource discovery servers 114a-c may be configured to perform operations associated with process control-related applications and communication applications that enable the resource discovery servers 114a-c and the respective controllers (e.g., a controller 122) to communicate with other devices and/or systems using any communication media (e.g., wireless, hardwired, etc.) and protocols (e.g., HTTP, SOAP, etc.). In other examples, each of the process control systems 104a-c may include one or more resource discovery servers.

Each resource discovery server 114a-c is communicatively coupled to a controller (e.g., the controller 122). The example controller 122 may perform one or more process control routines that have been configured and/or designed by a plant manager, process-control engineer, system engineer, a control system administrator, and/or other operator and/or user responsible for operation of the plant 102 and/or the entire process control environment 100. The controller 122 may be, for example, a DeltaV™ controller sold by Fisher-Rosemount Systems, Inc., an Emerson Process Management™ company. However, any other controller could be used instead. Further, while only one controller 122 is shown in FIG. 1, additional controllers of any type or combination of types may be coupled to each of the resource discovery servers 114*a-c*. While the illustrated example of FIG. 1 describes, in part, a process control system, the methods and apparatus described herein may also apply to test and measurement environments, such as laboratory testing, audit testing, and/or quality control analysis.

The controller 122 may be coupled to a plurality of field devices 126*a-b* and 130 via a controller bus 128 and/or an I/O device 124. During execution of a process control routine, the controller 122 may exchange information (e.g., commands, configuration information, measurement information, status information, etc.) with the field devices 128*a-b* and 130. For example, the controller 122 may be provided with a process control routine that, when executed by the controller 122, causes the controller 122 to send commands to the field devices 126*a-b* that cause the field devices 126*a-b* to perform specified operations (e.g., perform a measurement, open/close a valve, turn on/off a process pump, etc.) and/or to communicate information (e.g., measurement data) via the controller 122. Additionally, the controller 122 may cause the field devices 126*a-b* and 130 to acquire measurement values (e.g., pressure values, temperature values, flow values, voltage values, current values, etc.), perform algorithms or calculations (e.g., integrals, derivatives, addition, subtraction, etc.), control instrumentation (e.g., opening/closing valves, furnace adjustments, boiler adjustments, etc.), and/or to perform any other function(s).

The server discovery server 108 and the resource discovery servers 114*a-c* provide the workstations 106, 116, and/or 118 layered access to process control resources managed by controllers (e.g., the controller 122). The server discovery server 108 may include endpoint access controls that limit access to itself and to its list of resource discovery endpoints 114*a-c* associated with the resource discovery servers 114*a-c*. The server discovery server 108 provides each user and/or workstation 106, 116, and/or 118 a list of resource discovery endpoints associated with the resource discovery servers 114*a-c* based on the level of endpoint access controls implemented by the server discovery server 108. For example, an operator and/or user of the remote workstation 116 may be specified to have access only to the process control system 104*b* and/or to a specific resource discovery server (e.g., the server 114*b*) included within the process control system 104*b*. As a result, the server discovery server 108 provides a list including only the resource discovery endpoint of resource discovery server 114*b* when the operator and/or user of the remote workstation 116 requests a list of resource discovery endpoints. Alternatively, the server discovery server 108 may provide each user and/or workstation 106, 116 and/or 118 with a list of endpoints of resource discovery servers (e.g., the endpoints associated with the resource discovery servers 114*a-c*). The user and/or the workstations 106, 116, and/or 118 may then use these endpoints to retrieve a list of resource discovery endpoints directly from the resource discovery servers 114*a-c*.

The example server discovery server 108 may provide a list of resource discovery endpoints associated with the resource discovery servers 114*a-c* to authorized workstations (e.g., the workstations 106, 116 and/or 118). Alternatively, the example server discovery server 108 may provide a list of endpoints associated with the resource discovery servers 114*a-c* to authorized workstations (e.g., the workstations 106, 116, and/or 118). The authorized workstations may then use the list of endpoints to retrieve the resource discovery endpoints. Once the workstations 106, 116, and/or 118 have received a resource discovery endpoint of a selected resource discovery server (e.g., the resource discovery server 114*a*), the workstations 106, 116, and/or 118 may then access the resource discovery server (e.g., the server 114*a*) using the resource discovery endpoint. In some examples, the resource discovery server 114*a* may determine if the workstations 106, 116, and/or 118 are authorized to access the resource discovery endpoint. Upon the workstations 106, 116, and/or 118 accessing the resource discovery server 114*a* through the associated resource discovery endpoint, the resource discovery server 114*a* may implement endpoint access controls to determine the resources authorized to be accessed by the workstations 106, 116 and/or 118. The resource discovery server 114*a* may include resources associated with the field devices 126*a-b* and 130. An operator and/or user of any of the workstations 106, 116 and/or 118 may select the authorized resources.

When the workstations 106, 116 and/or 118 first access a resource discovery endpoint, the associated resource discovery server 114*a* creates a session. By the workstations 106, 116 and/or 118 selecting one or more resources provided by the resource discovery server 114*a*, the workstations 106, 116 and/or 118 request the resource discovery server 114*a* to create read, write, and/or subscribe endpoints that are used by the workstations 106, 116, and/or 118 to access the selected resources. If the workstations 106, 116 and/or 118 intend to read the resource, the workstations 106, 116 and/or 118 request a read endpoint from the resource discovery server 114*a*. If the workstations 106, 116 and/or 118 intend to update and/or execute (e.g., write) the resource, the workstations 106, 116 and/or 118 request a write endpoint from the resource discovery server 114*a*. If the workstations 106, 116, and/or 118 intend to subscribe to the resource, the workstations 106, 116, and/or 118 request a subscribe endpoint from the resource discovery server 114*a*.

The resource discovery server 114*a* provides these endpoints to the workstations 106, 116 and/or 118 using an alias identifier to mask the identity of the endpoint and an alias identifier to mask the identity of each resource to be accessed through the endpoint. The alias for a resource may be proposed by the workstations 106, 116 and/or 118 and confirmed by the resource discovery server 114*a*. The workstations 106, 116, and/or 118 may use the endpoint identifier to access the read, write, and/or subscribe endpoints and the resource identifiers of the selected resources to view and/or modify those resources. If the session is to be closed for any reason, including a request by the workstations 106, 116, and/or 118, the resource discovery server 114*a* terminates the session and deletes and/or closes any open read, write, and/or subscribe endpoints, identifiers associated with the endpoints, and/or identifiers associated with registered resources. Before the workstations 106, 116 and/or 118 can access the resource discovery server 114*a* again after the session has been closed, the workstations 106, 116 and/or 118 may be required to establish a new session with the resource discovery server 114*a*.

The server discovery server 108 and/or the resource discovery servers 114*a-c* may also implement security protocols for encrypting, hash marking, and/or signing communications with the workstations 106, 116 and/or 118. These security protocols used with the resource identifiers further protect the process control plant 102 from unauthorized parties and/or entities attempting to view and/or modify process control data transmitted from the resource discovery servers 114a-c and the workstations 106, 116, and/or 118.

In an example, an operator and/or user at the local workstation 106 sends a discover server request message to the server discovery server 108 to locate a resource discovery server from which the workstation 106 may use to obtain access to a pump speed of the pump field device 130 (e.g., a resource). The server discovery server 108 determines the resource discovery servers 114a-c that the operator, the user, and/or the workstation 106 are authorized to access. The server discovery server 108 determines that the workstation 106 may access the resource discovery server 114a and provides a list including the resource discovery endpoints of the resource discovery server 114a and/or an endpoint within the resource discovery server 114a that the workstation 106 may access to retrieve resource discovery endpoints of the resource discovery server 114a.

The workstation 106 then transmits a request message (e.g., a connect message) to open a session with the resource discovery server 114a. The workstation 106 sends this message to the address of the newly acquired resource discovery endpoint to that server 114a within the address field of the request message. The resource discovery server 114a receives the request message and opens the session after performing any endpoint access controls to determine if the session is authorized. The workstation 106 then transmits a series of messages (e.g., find resource request messages, open endpoint request messages, and/or register request messages) to discover the resources that the workstation 106, operator, and/or user are authorized to access. The resource discovery server 114a provides the resources, including the pump speed resource, within a list to the workstation 106. The pump speed resource may be identified by the pump name "PDT: P321" or, alternatively, by some other name such as the name of the pump speed parameter.

Upon the workstation 106 selecting the pump speed resource and requesting a read endpoint to access the pump speed resource, the resource discovery server 114a creates and/or opens a read endpoint and associates the pump speed with this newly created and/or opened read endpoint. In other examples, the resource discovery server 114a may associate the pump speed with an already created and/or opened read endpoint. Alternatively, the workstation 106 may first request the creation and/or opening of the read endpoint and then separately associate the pump speed parameter to the read endpoint. Alternatively, the workstation 106 may first add the pump speed parameter to a list of parameters and then add the list of parameters to the read endpoint. Additionally, if the operator and/or user at the workstation 106 is authorized to create and/or open a write and/or a subscribe endpoint, a request could be sent from the workstation 106 to the resource discovery server 114a to create and/or open the write and/or the subscribe endpoint and associate the pump speed with the newly created and/or opened write endpoint.

Furthermore, the resource discovery server 114a may generate an identifier such as "1621545" to read the pump speed resource and transmit the identifier to the workstation 106. Alternatively, the workstation 106 may provide the identifier. In another example implementation, two identifiers may be used for optimization purposes. For example, the workstation 106 may use an identifier to identify the pump speed when the workstation 106 sends requests for the pump speed to the server 114a and the server 114a may use a different identifier for sending values to the workstation 106. Additionally, the server 114a may require separate identifiers for reading, writing, and/or subscribing or, alternatively, the same identifiers could be used for reading, writing, and/or subscribing. In the example of FIG. 1, the server 114a uses the same pump speed identifier (e.g., 1621545) for reading and writing the pump speed. Alternatively, the resource discovery server 114a may generate an identifier such as "36285" for the newly created and/or opened read endpoint and an identifier such as "88732" for the newly created and/or opened write endpoint and transmit those identifiers to the workstation 106.

The operator and/or user at the workstation 106 may read the pump speed resource by sending a message including the pump speed identifier (e.g., 1621545) and the read endpoint identifier (e.g., 36285) in a message to the resource discovery server 114a. The resource discovery server 114a accesses the controller 122 for the current pump speed value (if the server 114a has not cached the pump speed value) and transmits the pump speed value to the workstation 106 in a message using the pump speed identifier (e.g., 1621545). Additionally, the operator and/or user at the workstation 106 may change the pump speed by generating a message with the new pump speed, the pump speed identifier (e.g., 1621545), and the write endpoint identifier (e.g., 88732) and transmitting the message to the resource discovery server 114a. Upon receiving the message, the resource discovery server 114a transmits the new pump speed to the controller 122 to set the speed of the pump 130 to the new specified pump speed. The operator and/or user at the workstation 106 may then close the session with the resource discovery server 114a. Upon closing, the resource discovery server 114a terminates the session and deletes the identifiers for the resources, read endpoints, write endpoints, and/or the subscribe endpoints.

The example process control system 104a is provided to illustrate one type of system within which the example methods and apparatus described in greater detail below may be advantageously employed. However, the example methods and apparatus described herein may, without limitation, be advantageously employed in other systems of greater or less complexity and/or different types of systems than the example process control system 104a shown in FIG. 1. Furthermore, the read, write, and/or subscribe endpoints may be implemented using additional methods and apparatus related to retrieving and/or updating data, events, and alarms including, for example, polling and callback mechanisms.

Figure 2:
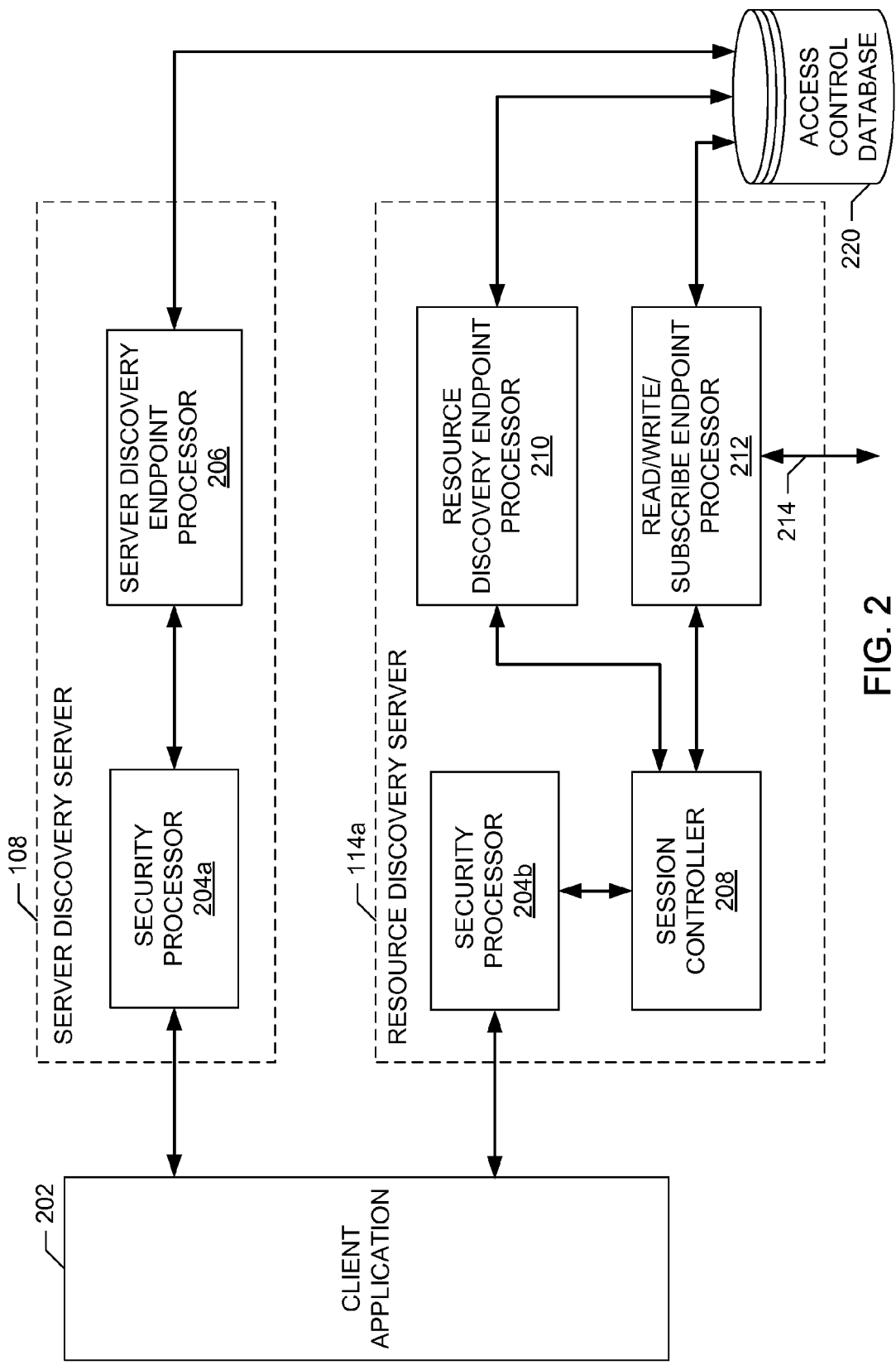
FIG. 2 is a functional block diagram of the example server discovery server and the resource discovery server of FIG. 1.

FIG. 2 is a block diagram of the example server discovery server 108 and the example resource discovery server 114a of FIG. 1. The server discovery server 108 and the resource discovery server 114a are communicatively coupled to a client application 202. The example client application 202 may include any process control application and/or a data system application that may be used to access information associated with the resources of a system that provides access to the current or historical values of data, events, and alarms. For example, the client application 202 may be a DeltaV™ read/write control application.

The client application 202 is used to access resources on behalf of an operator, user, and/or automated user. The example client application 202 may include identification information associated with the user of the client application 202. The client application 202 may be operating on any of the workstations 106, 116, and/or 118, and may include identification information. Furthermore, the client application 202 may be coupled to the server discovery server 108 and/or the resource discovery server 114a via the LAN 112 and/or the WAN 120 of FIG. 1.

The example client application 202 of FIG. 2 transmits request messages to the server discovery server 108 and/or the resource discovery server 114a. The request messages may include messages to access endpoints to locate resources within the process control system 104a. Additionally, the client application 202 may assign session-specific unintelligible identifiers to selected resources, read endpoints, write endpoints, and/or subscribe endpoints. Alternatively, the client application 202 may receive a session-specific unintelligible identifier assignment from the resource discovery server 114a for any resource, read endpoint, write endpoint, and/or subscribe endpoint. Alternatively, the client application 202 and the resource discovery server 114a may exchange respective session-specific unintelligible identifiers. The client application 202 stores the assigned identifier to a corresponding resource, read endpoint, write endpoint, and/or subscribe endpoint. Thus, resource data received by the client application 202 is associated with a corresponding resource identifier that the client application 202 may use to identify the resource and/or the endpoint associated with the encoded resource data. Furthermore, the client application 202 may include encryption deciphering capabilities to receive encrypted data from the resource discovery server 114a. While FIG. 2 shows a single client application 202, in other examples, multiple client applications may access the servers 108 and 114a.

To provide security measures such as encryption and/or endpoint access controls to communications with the client application 202, the example server discovery server 108 includes a security processor 204a. Additionally, to provide security such as encryption and/or endpoint access controls measures to communications with the client application 202, the example resource discovery server 114a includes a security processor 204b. The example security processors 204a-b may include encryption processors and/or digital signature generators to protect outgoing communications from unauthorized third parties. The encryption processors may use any type of encryption encoders to format communications destined for the client application 202 in a format unreadable to unauthorized users. The digital signature generator protects communications from being tampered with by unauthorized third parties. A digital signature generator may use any type of cryptographically secure signature generators (e.g. hash codes) that enable the detection of values that have been modified by an unauthorized third party between the client application 202 and the servers 108 and/or 114a. Additionally, the security processors 204a-b may include other forms of communication security including authentication mechanisms and/or access controls.

The example security processors 204a-b may decode encrypted, and/or signed communications originating from the client application 202. Upon decoding the communications, the security processors 204a-b transmit the communications to the intended destination within the respective servers 108 and 114a. Additionally, the security processor 204a may filter request messages originating from the client application 202 by identification information so that only authorized users may access the server discovery server 108. Alternatively, in some example implementations, the servers 108 and 114a may not include the security processors 204a-b. In these examples, security functions associated with the security processors 204a-b may be included within a firewall (e.g., the firewall 110) and/or included elsewhere within the process control plant 102.

To manage discovery of resource discovery servers, the example server discovery server 108 includes a server discovery endpoint processor 206. The example server discovery endpoint processor 206 processes requests from the client application 202 so that only authorized requesters may discover resource discovery servers. The server discovery endpoint processor 206 receives request messages (e.g., discover server request messages) to discover resource discovery servers from client applications including the example client application 202.

Upon receiving a request message, the server discovery endpoint processor 206 uses information within and/or associated with the request message to determine the identity of an operator and/or user using the client application 202 and/or an identity of the workstation operating the client application 202 and/or other information associated with performing endpoint access control. For example, the server discovery endpoint processor 206 may check a user identification field within the request message to determine if the user identification value corresponds to an authorized user. Alternatively, the example server discovery endpoint processor 206 may check a workstation identification value, a client application type, a client application serial number, a client application location, and/or a protocol type within the request message. Additionally, the example server discovery endpoint processor 206 may examine other information related to the message and/or the client application 202 to assist in authorization processing of the message (e.g. if the message was transmitted from a centralized security computer).

The server discovery endpoint processor 206 may use an access control list to determine which resource discovery servers are available to the client application 202. Alternatively, the server discovery endpoint processor 206 may implement other functionally to determine security attributes associated with the received message. The access control list and/or or the other functionally may include a list of approved users referenced to the resource discovery endpoints that each approved request is authorized to access. For example, system operators and/or users assigned to the process control system 104a may be authorized to access resource discovery endpoints associated with the process control system 104a. Additionally, the access control list may include a list of workstations and/or client applications referenced to resource discovery endpoints that each workstation and/or client application is authorized to access. The access control list may be predetermined by managers and/or controllers of the process control systems 104a-c and/or the process control plant 102.

Upon referencing the identification information within a request message to an access control list, the server discovery endpoint processor 206 returns a list of the authorized resource discovery endpoints to the client application 202. The list of the resource discovery endpoints may include a name of a resource discovery endpoint, a name of a system that provides access for an endpoint, and/or a type of information that the endpoint provides. Additionally, the amount of information provided in the list about each resource discovery endpoint may be limited by the server discovery endpoint processor 206 based on the client application 202 requesting the endpoint list. This limitation makes malicious profiling of the resource discovery endpoints by third parties and/or interlopers relatively difficult. Malicious profiling may include examining attributes of a potential target (e.g. the resource discovery server 114a) to formulate an intrusion into the target. For example, if the client application 202 is remotely located from the process control plant 102, the server discovery endpoint processor 206 may only provide reference names for each resource discovery endpoint listed. Each resource discovery endpoint listed corresponds to a resource discovery server 114a within the process control environment 100. For example, the server discovery endpoint processor 206 may provide the client application 202 a list of resource discovery endpoints corresponding to the resource discovery servers 114a-c.

The example server discovery endpoint processor 206 of FIG. 2 provides the client application 202 with a list of resource discovery endpoints. The server discovery endpoint processor 206 may return the information necessary to submit a request (e.g., a connect message) to open a session within the resource discovery server 114a or, alternatively, the server discovery endpoint processor 206 may return the identity of the resource discovery endpoints enabling the client application 202 to select a resource discovery endpoint. Upon the client application 202 selecting one or more of the resource discovery endpoints, the server discovery endpoint processor 206 transmits to the client application 202 the information to open a session with each of the selected resource discovery endpoints.

To manage access to resources, resource discovery endpoints, read endpoints, write endpoints, and/or subscribe endpoints, the example resource discovery server 114a includes a session controller 208, a resource discovery endpoint processor 210 and a read/write/subscribe endpoint processor 212. FIG. 2 shows only the resource discovery server 114a coupled to the client application 202. In other examples, the client application 202 may be coupled to the resource discovery servers 114b-c that may include their own session controllers 208, resource discovery endpoint processors 210 and read/write/subscribe endpoint processors 212. The client application 202 receives the location and/or information associated with the resource discovery endpoint from the server discovery endpoint processor 206. The client application 202 accesses the resource discovery server 114a using this information to send a request message (e.g., a connect message) to the resource discovery endpoint associated with the resource discovery server 114a.

The example session controller 208 of FIG. 2 manages a resource access session for the client application 202. The session represents an instance of a communication association between the client application 202 and the resource discovery server 114a. Additionally, the session controller 208 may manage sessions for other client applications that may access the resource discovery server 114a. The session controller 208 initiates a session upon receiving a connect message to open a session with the resource discovery endpoint associated with the server 114a from the client application 202. Until a session is opened by the session controller 208, the session controller 208 may reject any other request from the client application 202. While the session is open, the session controller 208 routes each request message from the client application 202 to the resource discovery endpoint processor 210.

If the client application 202 selects resources and/or resource endpoints from the resource discovery endpoint processor 210 and requests the creation of read, write, and/or subscribe endpoints to access the selected resources (or to assign the selected resources to previously created and/or opened read, write, or subscribe endpoints), the resource discovery endpoint processor 210 stores references to the selected resources and the associated read, write, and/or subscribe endpoints. Additionally, the session controller 208 may store references to the selected resources and their associated read or write endpoints.

A read/write/subscribe endpoint processor (e.g., the read/write/subscribe endpoint processor 212) may be created and/or used for each read, write, and/or subscribe endpoint that the client application 202 creates and/or opens. For each of these read/write/subscribe endpoint processors, a security processor and/or a session controller may also be created and/or used. Creating and/or using a processor may include allocating portions of a server to perform the functions associated with the processor. Alternatively, creating and/or using a processor may include activating processors on one or more adjacent servers to perform the functions associated with each of the newly created processors. Creating and/or using a security processor and/or a session controller for each read/write/subscribe endpoint processor provides additional security by separating communication paths for messages transmitted between the resource discovery endpoint processor 210 for different sessions for different client applications. Additionally, separating communication paths provides additional security for messages transmitted to and/or from the resource discovery endpoint processor 210 and messages transmitted to and/or from a read endpoint, a write endpoint, and/or a subscribe endpoint. The read/write/subscribe endpoint processors 212 may be implemented on a separate computing medium than the security processors 204b and/or the session controllers 208 to provide another separate layer of security. Alternatively, the read/write/subscribe endpoint processor 212 may be used to provide access to each read, write, and/or subscribe endpoint.

For each read/write/subscribe endpoint processor 212, the resource discovery endpoint processor 210 and/or the session controller 208 may transmit resources selected by the client application 202 and/or associated unintelligible identifiers of those resources to the corresponding read/write/subscribe endpoint processor 212. These unintelligible identifiers may be assigned by the client application 202, by the resource discovery endpoint processor 210 or, alternatively, by both.

By storing identifier reference information, the example read/write/subscribe endpoint processor 212 manages which identifiers correspond to which resources for each client application 202. Thus, communications between the read/write/subscribe endpoint processor 212 and the client application 202 may use the identifiers as a form of protection against unauthorized parties or entities that may attempt to monitor the communications. In some examples, multiple client applications may use the same identifiers for different resources. Similarly, the same client may use the same identifiers for different resources accessed through different endpoints. Alternatively, different identifiers for the same resources may be used by the same client to access the resources through different endpoints. In these examples, the resource discovery endpoint processor 210 manages the assignment of these identifiers to resources and/or to the read/write/subscribe endpoint processors 212. The read/write/subscribe endpoint processors 212 manage the use of the identifiers for each client application 202 to access the associated resources.

The example session controller 208 may also manage unintelligible identifiers for read endpoints, write endpoints, and/or subscribe endpoints for the client application 202. For example, the session controller 208 may store each read, write, and/or subscribe endpoint and the corresponding unintelligible identifier assigned by the resource discovery endpoint processor 212.

Furthermore, the example session controller 208 validates and directs request messages from the client application 202. Validation ensures that a session identified in the request message is valid and/or authorized to access the intended processors 210 and/or 212. Valid request messages intended for the resource discovery endpoint of the server 114a may be routed by the session controller 208 to the resource discovery endpoint processor 210. Similarly, valid request messages intended for read endpoints, write endpoints, and/or subscribe endpoints may be routed by the session controller 208 to the appropriate read/write/subscribe endpoint processor 212. Additionally, the session controller 208 may validate request messages by determining if a session identified within the message is valid and/or by determining if an unintelligible identifier associated with a read, write, and/or subscribe endpoint is valid. Valid request messages intended for read, write, and/or subscribe endpoints are then routed by the session controller 208 to the corresponding read/write/subscribe endpoint processor 212.

The example session controller 208 of FIG. 2 terminates a session when the client application 202 sends a message indicating the client application 202 is to terminate access to the resource discovery server 114a. Upon receiving a termination message, the session controller 208 deletes the stored session information including resources, read endpoints, write endpoints and/or the corresponding identifiers. If the client application 202 attempts to access any of the resources and/or endpoints from the deleted session, the client application 202 will be required to initiate a new session and reregister for each resource.

To manage and/or control access to resources and associated endpoints, the example resource discovery server 114a of FIG. 2 includes the resource discovery endpoint processor 210. The example resource discovery endpoint processor 210 receives request messages (e.g., find resource request messages, open endpoint request messages, and/or register request messages) from the client application 202 via the session controller 208. Upon receiving a request message, the resource discovery endpoint processor 210 may use information within and/or associated with the request message to control access to the resources that the client application 202 may discover and subsequently access. For example, the server discovery endpoint processor 206 may check a user identification field within the request message to determine which resources the client application 202 is authorized to access. Alternatively, the example resource discovery endpoint processor 210 may check a workstation identification value, a client application type, a client application serial number, a client application location, and/or a protocol type within the request message.

The example resource discovery endpoint processor 210 may use an access list to determine which resources the client application 202 may access. The access list may include a list of authorized users, workstations and/or client applications each referenced to a list of resources. In some example implementations, the list of resources may include a code that corresponds to a group of resources. Upon determining which resources the client application 202 is authorized to access, the resource discovery endpoint processor 210 provides that list of resources to the client application 202. The list may include names of the resources, information included within the resources, and/or coded information about the resources. In some examples, the list may include resources grouped together in a set. In these examples, a client application may access some or all of the resources within the set by selecting the set.

The example resource discovery endpoint processor 210 provides the client application 202, if authorized, with a read, write, and/or subscribe endpoint to which one or more selected resources may be assigned. Additionally, the resource discovery endpoint processor 210 adds each selected resource to a read, write, and/or subscribe endpoint managed by a corresponding session controller (e.g., the session controller 208) and/or a shared read/write/subscribe endpoint processor 212. The resource discovery endpoint processor 210 may transmit each selected resource so that the read/write/subscribe endpoint processor 212 may add each resource to a read, write, and/or subscribe endpoint.

Furthermore, the example resource discovery endpoint processor 210 generates identifiers for each selected resource and transmits the identifiers to the client application 202. For example, if the client application 202 selects a tank resource, the resource discovery endpoint processor 210 may assign the tank resource an unintelligible identifier of "DM45." The resource discovery endpoint processor 210 transmits this DM45 identifier to the client application 202. Subsequent communications between the client application 202 and the resource discovery server 114a may use the DM45 identifier when referring to the tank resource.

The example resource discovery endpoint processor 210 receives register request messages and/or open endpoint request messages to create and/or open one or more read, write, and/or subscribe endpoints to which selected resources may be added. The resource discovery endpoint processor 210 determines if the client application 202 that generated the register request message is authorized to read, write, and/or subscribe to the selected resources. Generally, if the client application 202 is provided access to a resource, the client application 202 is allowed read and/or subscribe access to that resource. However, the client application 202 may not have write access to the resource.

The resource discovery endpoint processor 210 also determines if the client application 202 is authorized for write access by using endpoint access controls. For example, the endpoint access controls may employ an access control list that may include a list of authorized users and/or client applications 202. If the client application 202 is authorized for write access, the resource discovery endpoint processor 210 creates and/or opens one or more authorized write endpoints, as requested, for the resources selected by the client application 202. The resource discovery endpoint processor 210 then adds the selected resources that the client application 202 is authorized to write to the newly created and/or opened write endpoints.

To manage read endpoints, write endpoints, subscribe endpoints and access to process control resources, the example resource discovery server 114a of FIG. 2 includes the read/write/subscribe endpoint processor 212. The read/write/subscribe endpoint processor 212 determines if the client application 202 is authorized for read, write, and/or subscribe access by using endpoint access controls for messages that request access to a resource. For example, the endpoint access controls may employ an access control list that may include a list of authorized users and/or client applications 202. If the read/write/subscribe endpoint processor 212 receives a request to read, write, or subscribe to a given resource, the read/write/subscribe endpoint processor 212 verifies that the client application 202 is authorized for read, write, and/or subscribe access to that resource.

Additionally, the example read/write/subscribe endpoint processor 212 provides and/or grants access to resources via a communication path 214. For example, a selected resource could be located in the controller 122 of FIG. 1. When the client application 202 transmits messages to read, write, and/or subscribe to selected resources, the example read/write/subscribe endpoint processor 212 uses the unintelligible identifiers within the message to access the resource within the controller 122. For messages sent to a read endpoint, the read/write/subscribe endpoint processor 212 retrieves the desired resource (e.g., a value, an alarm, and/or an event). Similarly, for messages sent to a write endpoint, the read/write/subscribe endpoint processor 212 writes the data to the resource (e.g. the controller 122 of FIG. 1).

To store endpoint access control information used by the server discovery endpoint processor 206, the resource discovery endpoint processor 210, and/or the read/write/subscribe endpoint processor 212, the example servers 108 and 114*a* of FIG. 2 are communicatively coupled to an access control database 220. In some examples, the access control database 220 may be included within the servers 108 and/or 114*a*. Alternatively, the example access control database 220 may be included within the process control systems 104*a-c* and/or within the process control plant 102 of FIG. 1. Furthermore, the access control database 220 may be included within a central access control system in the process control plant 102. The example access control database 220 may be implemented by EEPROM, RAM, ROM, and/or any other type of memory. Additionally, the access control database 220 may be implemented by a structured query language (SQL) server and/or any other database technology. A security administrator or other authorized user may access the access control database 220 to update, add, delete, and/or modify authorized users and their level of access within the access control lists.

While an example manner of implementing the server discovery server 108 and the resource discovery server 114*a* is depicted in FIG. 2, one or more of the interfaces, data structures, elements, processes and/or devices illustrated in FIG. 2 may be combined, divided, rearranged, omitted, eliminated and/or implemented in any other way. For example, the example security processors 204*a-b*, the example server discovery endpoint processor 206, the example session controller 208, the example resource discovery endpoint processor 210, the example read/write/subscribe endpoint processor 212, and/or the example access control database 220 illustrated in FIG. 2 may be implemented separately and/or in any combination using, for example, machine-accessible or readable instructions executed by one or more computing devices and/or computing platforms (e.g., the example processing platform 500 of FIG. 5).

Further, the example security processors 204*a-b*, the example server discovery endpoint processor 206, the example session controller 208, the example resource discovery endpoint processor 210, the example read/write/subscribe endpoint processor 212, the example access control database 220 and/or, more generally, the server discovery server 108 and/or the resource discovery server 114*a* may be implemented by hardware, software, firmware and/or any combination of hardware, software and/or firmware. Thus, for example, any of the example security processors 204*a-b*, the example server discovery endpoint processor 206, the example session controller 208, the example resource discovery endpoint processor 210, the example read/write/subscribe endpoint processor 212, the example access control database 220 and/or, more generally, the server discovery server 108 and/or the resource discovery server 114*a* can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 3:
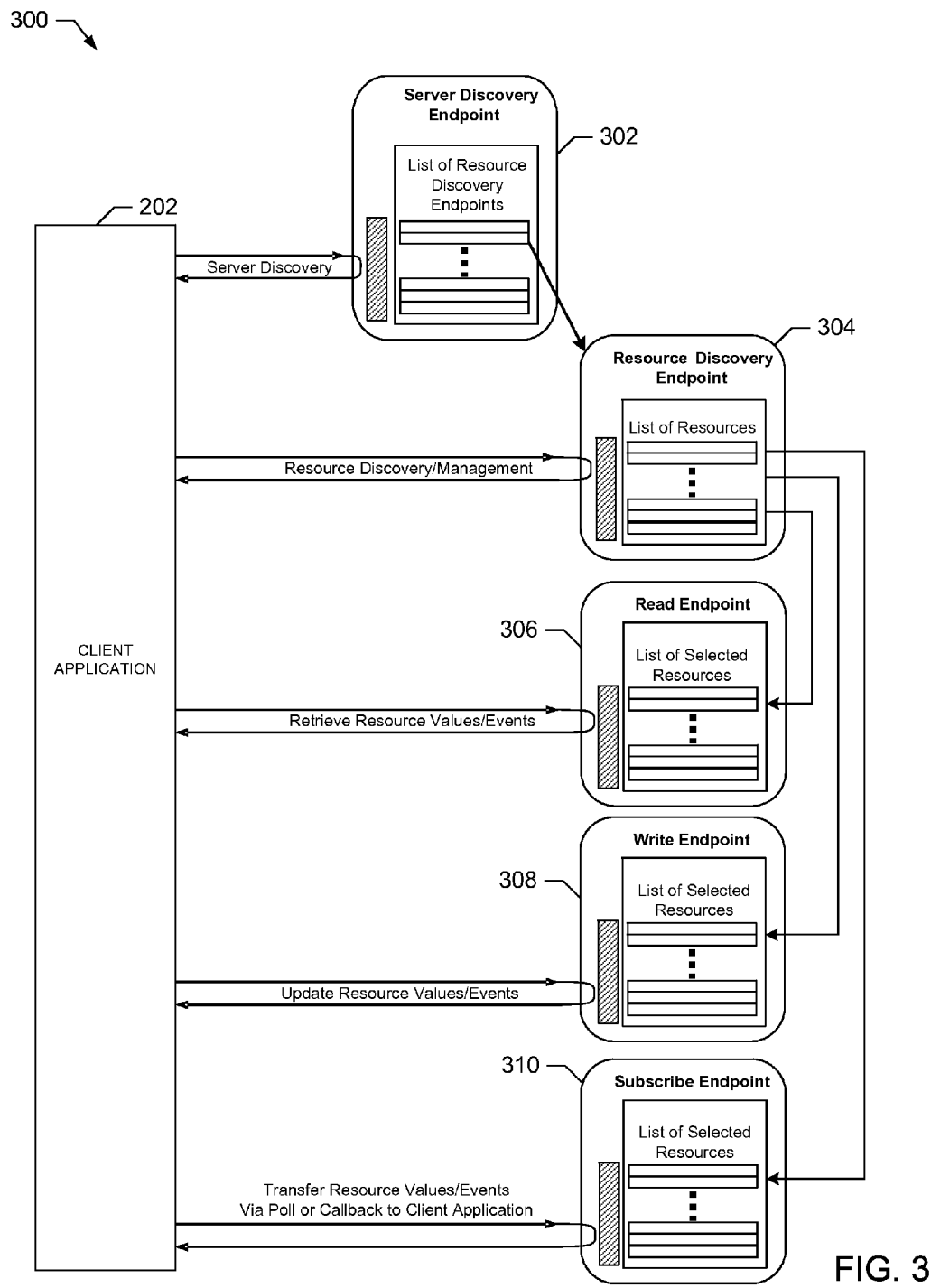
FIG. 3 is a diagram depicting an example layered security provided by the example server discovery server and the resource discovery servers of FIGS. 1 and 2.

FIG. 3 is a diagram depicting an example layered security provided 300 by the example server discovery server 108 and the resource discovery server 114*a* of FIGS. 1 and 2. The layered security diagram 300 includes the client application 202 of FIG. 2 accessing a server discovery endpoint 302, a resource discovery endpoint 304, a read endpoint 306, a write endpoint 308, and a subscribe endpoint 310. The layered security diagram 300 depicts an example process for the client application 202 to access resources within the process control system 104*a*.

Initially, the client application 202 of FIG. 3 accesses the server discovery endpoint 302 of the server discovery server 108 of FIGS. 1 and 2. The server discovery endpoint 302 includes a list of resource discovery servers available to the client application 202. Additionally, the hashed box adjacent to the list of servers within the server discovery endpoint 302 represents the security processor 204*a* of FIG. 2. The list of resource discovery servers may be determined by matching the client application 202 to resource discovery servers that the client application 202 is authorized to access. The client application 202 may select one or more of the listed servers. By selecting a listed server, the server discovery endpoint 302 provides the client application 202 with the endpoint for the selected server. Alternatively, the server discovery endpoint 302 may provide the client application 202 with the resource discovery endpoint 304 of each resource discovery server at the same time.

Next, the client application 202 accesses the resource discovery endpoint 304 using an endpoint provided by the server discovery endpoint 302. Alternatively, in examples where the client application 202 is initially configured with the endpoint and/or the address of the resource discovery endpoint 304, the client application 304 may access the resource discovery endpoint 304 without first accessing the server discovery endpoint 302. The resource discovery endpoint 304 includes a list of resources accessible by the client application 202. The list of resources may include groups of resources and/or individual resources. Additionally, the hashed box adjacent to the list of servers within the resource discovery endpoint 304 represents the security processor 204*b* of FIG. 2. In example implementations, the client application 202 may select one or more resources to register from the list of available resources. In these examples, the client application 202 requests the resource discovery endpoint 304 to create and/or open one or more read endpoints 306, one or more write endpoints 308, and/or one or more subscribe endpoints 310. Additionally, the client application specifies which of the selected resources are to be associated with the newly created and/or opened read endpoint 306, the newly created and/or opened write endpoint 308, and/or the newly created and/or opened subscribe endpoint 310. The client application may specify the resources at the time the endpoints are created and/or opened, after the endpoints are created and/or opened, and/or during the creation and/or opening of the endpoints.

Upon the client application 202 creating and/or opening the read endpoint 306, the write endpoint 308, and/or the subscribe endpoint 310, the resource discovery endpoint 304 provides the client application 202 with an unintelligible identifier associated with each of the newly created and/or opened endpoints 306-310. Additionally, upon selecting a resource and assigning the resource to the read endpoint 306, the write endpoint 308, and/or the subscribe endpoint 310, the selected resource is included within a list of selected resources in the read endpoint 306, the write endpoint 308, and/or the subscribe endpoint 310.

For each resource added to the read endpoint 306, the write endpoint 308, and/or the subscribe endpoint 310, an unintelligible identifier or, alternatively, a pair of unintelligible identifiers (e.g., one assigned by the client application 202 and one assigned by the resource discovery endpoint 304) corresponding to the resource is/are transmitted to the client application 202 by the resource discovery endpoint 304. The client application 202 may read data (e.g., values, alarms, and/or events) associated with a selected resource by accessing the resource data via the read endpoint 306. Similarly, the client application 202 may write data to a resource by accessing the resource via the write endpoint 308. The client application 202 may also subscribe to data of a resource by accessing the resource via the subscribe endpoint 310.

Figure 4A:
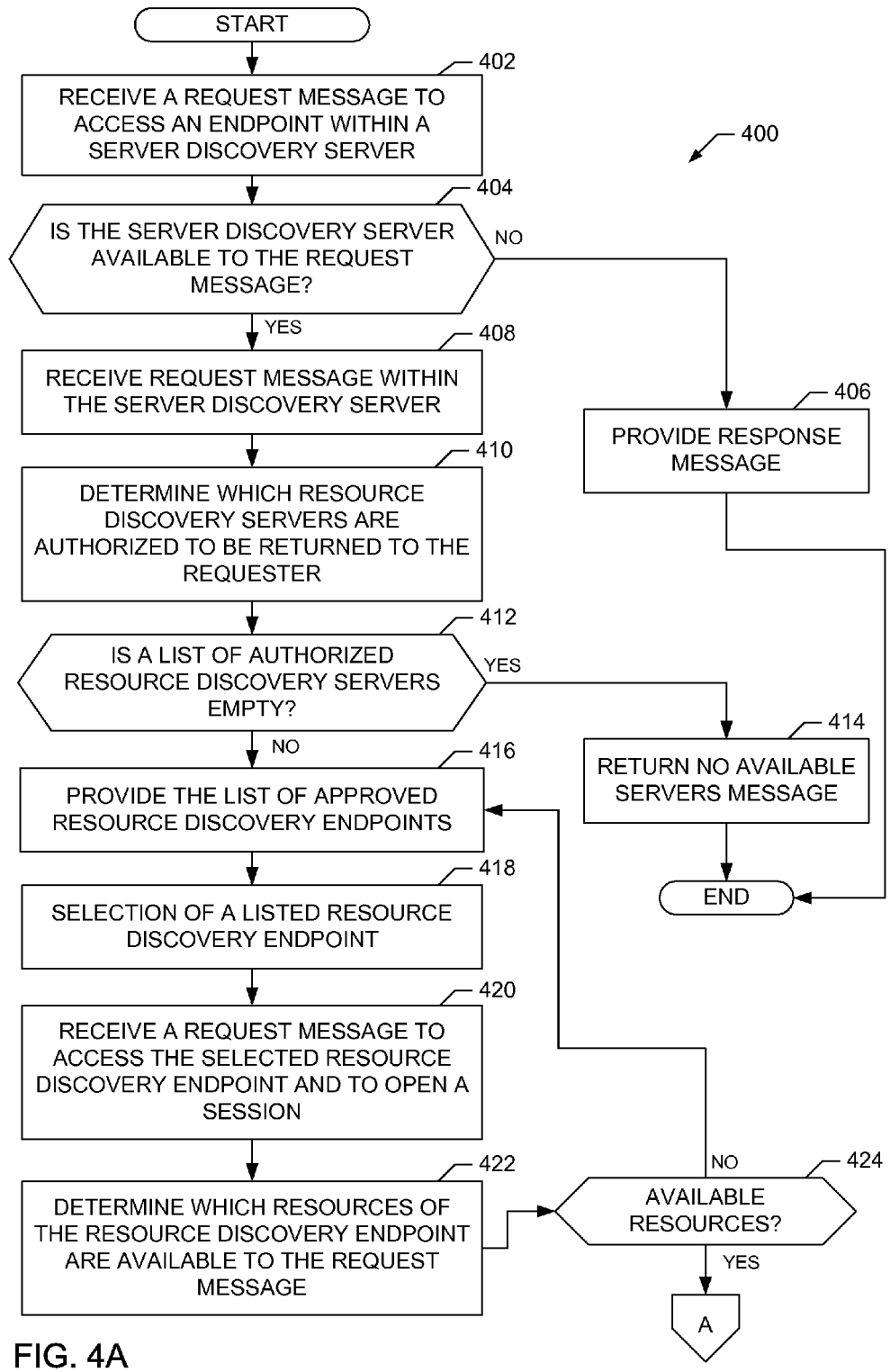
FIGS. 4A and 4B are flowcharts depicting an example process that may be used to implement the example server discover server, the example resource discover servers, the example client application, and/or the example process control environment of FIGS. 1, 2, and/or 3.
Figure 4B:
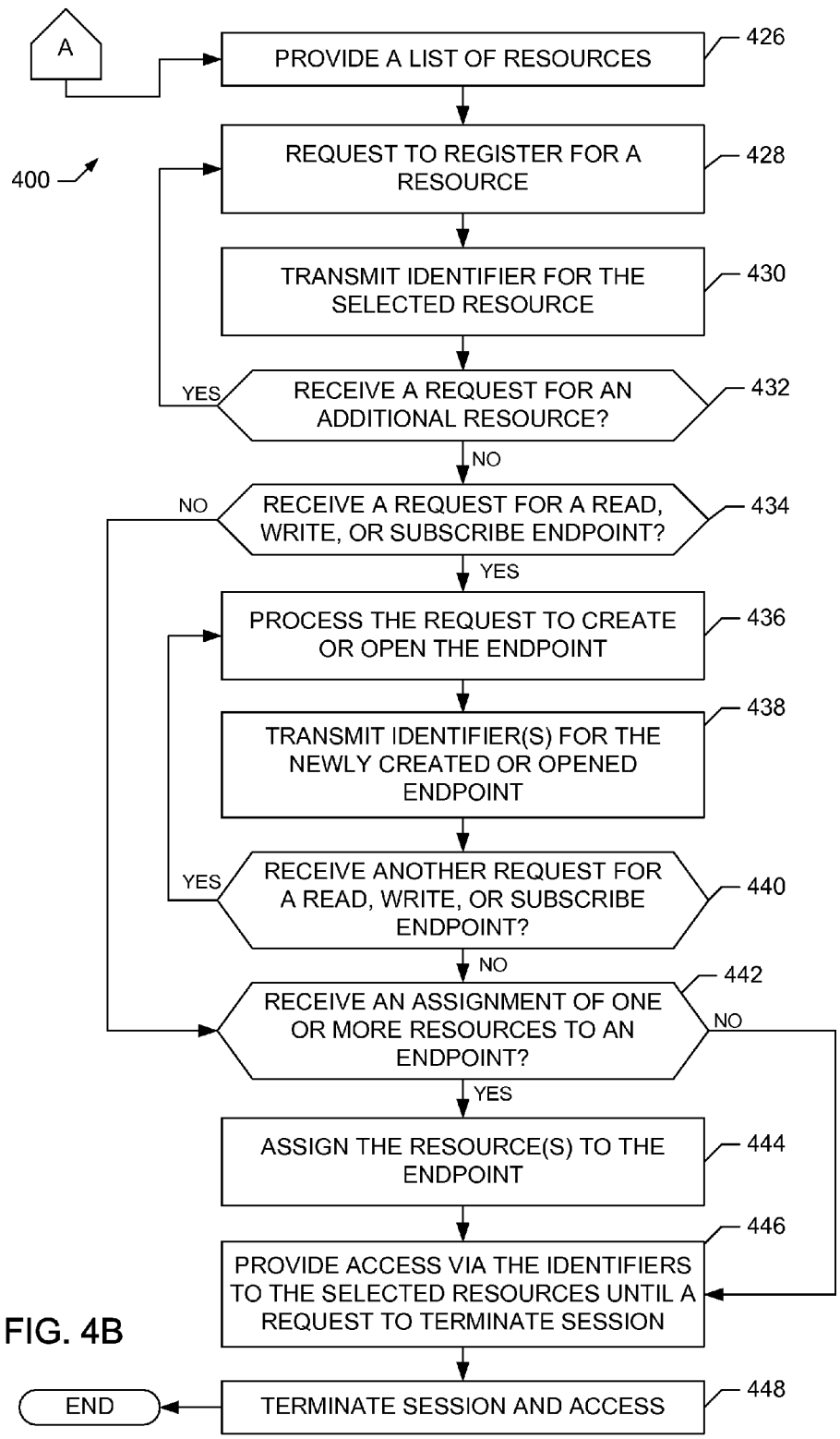

FIGS. 4A and 4B are flowcharts depicting an example process that may be carried out to implement the example server discovery server 108, the example resource discover servers 114a-c, the example client application 202, and/or the example process control environment 100 of FIGS. 1, 2, and/or 3. The example process of FIGS. 4A and 4B may be carried out by a processor, a controller and/or any other suitable processing device. For example, the example process of FIGS. 4A and 4B may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods, processes or data structures, and which can be accessed by a processor, a general-purpose or special-purpose computer, or other machine with a processor (e.g., the example processor platform 500 discussed below in connection with FIG. 5). Combinations of the above are also included within the scope of computer-readable media.

Processes comprise, for example, instructions and/or data that cause a processor, a general-purpose computer, special-purpose computer, or a special-purpose processing machine to implement one or more particular processes. Alternatively, some or all of the example operations of FIGS. 4A and/or 4B may be implemented using any combination(s) of ASIC(s), PLD(s), FPLD(s), discrete logic, hardware, firmware, etc.

Also, one or more of the example operations of FIGS. 4A and/or 4B may instead be implemented using one or more manual operations or as any combination of any of the foregoing techniques, for example, any combination of firmware, software, discrete logic and/or hardware. Further, many other processes of implementing the example operations of FIGS. 4A and/or 4B may be employed. For example, the order of execution of the blocks may be changed, and/or one or more of the blocks described may be changed, eliminated, sub-divided, or combined. Additionally, any or all of the example operations of FIGS. 4A and/or 4B may be carried out sequentially and/or carried out in parallel by, for example, separate processing threads, processors, devices, discrete logic, circuits, etc.

The example process 400 of FIGS. 4A and 4B provides layered security for interface access control within the example process control environment 100 of FIG. 1. Additionally, the example process 400 may provide layered security for interface access control for other types of data systems including manufacturing automation systems, industrial systems, etc. Furthermore, the example process 400 may be performed for each request to access an endpoint within a server discovery server (e.g., the server discovery server 108 of FIG. 1). For each request to access the server discovery server 108, the example process 400 may be operated in series and/or in parallel with other instances of the example process 400.

The example process 400 begins when a discover server request message to access an endpoint within the server discovery server 108 is received (block 402). The request message may have originated from a client application located at a remote workstation (e.g., the remote workstations 116 and/or 118) or, alternatively, from a local workstation (e.g., the local workstation 106). The example process 400 determines if the server discovery server 108 is accessible or available to the request message by checking privileges associated with the request message (block 404). For example, the process 400 may check a user identification field within the request message to determine if the user identification value corresponds to an authorized user. Alternatively, the example process 400 may check a workstation identification value, a client application type, a client application serial number, a client application location, and/or a protocol used to transfer the message to determine if the originator of the request message is authorized to access the server discovery server 404.

If the example process 400 determines that the request message is not authorized to access the server discovery server 108 (block 404), the process 400 generates and/or transmits a response message to the client application (block 406). The response message may reject the request to access the server discovery server 108. Upon generating and transmitting the response message (block 406), the example process 400 ends.

However, if the example process 400 determines that the request message is authorized to access the server discovery server 108 (block 404), the request message is received within the server discovery server 108 (block 408). The example process 400 then determines which resource discovery servers (e.g., the resource discovery servers 114a-c) are authorized to be accessed by the client application associated with the request message (block 410). The resource discovery servers available to the client application may be based on the identification field, the workstation identification value, the client application type, the client application serial number, the client application location, and/or the protocol within and/or associated with the request message.

If the example process 400 determines there are no authorized resource discovery servers (e.g., an empty list of authorized resource discovery endpoints), a message is generated and/or transmitted to the client application indicating that there are no available resource discovery servers (block 414). Upon transmitting the message (block 414), the example process 400 ends.

However, if there is at least one authorized resource discovery server (block 412), the example process 400 provides a list of the approved and/or authorized resource discovery endpoints (e.g., resource discovery endpoints of the resource discovery servers 114a-c) to the client application (block 416). In other examples, an endpoint may be provided for each resource discovery server that provides the client application with a list of resource discovery endpoints. Next, the client application selects one or more of the listed resource discovery endpoints (block 418). In other examples, the client application may not select a resource discovery endpoint and/or may end the example process 400.

The example process 400 continues when a request message to access the selected resource discovery endpoint (e.g., the resource discovery server 114a) is received (block 420). Alternatively, in examples where the client application is initially configured with the resource discovery endpoint, the example process 400 may start when a request message (e.g., a connect message) to access the resource discovery endpoint is received (block 420). The request message is generated and/or transmitted from the client application. Additionally, when the example process 400 receives the request message to access a resource discovery endpoint, the example process 400 opens a session for the client application. In other examples, the client application may select a plurality of resource discovery endpoints. In these examples, the example process 400 may open a session for each selected resource discovery endpoint. Additionally, for each resource discovery endpoint selected, the example process 400 may operate separate instances of the blocks 420-446.

Upon receiving a request message to access a resource discovery endpoint (block 420), the example process 400 determines which resources of the selected resource discovery endpoint are available to the client application (block 422). The resource(s) available to the client application may be based on the identification field, the workstation identification value, the client application type, the client application serial number, the client application location, and/or the protocol within and/or associated with the request message. Additionally, the available resources may be predefined for the client application by a manager, user, and/or operator of the process control plant 102. The example process 400 then determines if there are available resources associated with the request message (block 424). If there are no available and/or authorized resources, the example process 400 may again provide the list of resource discovery endpoints so that the client application may select another resource discovery endpoint (block 416). Additionally, the example process may close the session with the client application.

If there is at least one available resource (block 424), the example process 400 then provides a list of available resources to the client application (block 426). Next, the client application may request to register to access one of the listed resources (block 428). Alternatively, the client application may request to register to access more than one of the listed resources in the same request. In other example implementations, the client application may select another resource discovery endpoint or end the example process 400.

Upon selecting a resource to register (block 428), the client application transmits to the resource discovery endpoint an identifier for the selected resource (block 430). The identifier is only known by the client application and the resource discovery server that includes the resource discovery endpoint of the selected resource. When the resource discovery endpoint receives an identifier from the client application, the resource discovery server associated with the resource discovery endpoint stores the transmitted identifier for the resource within the context of the session. These identifiers are unintelligible to unauthorized users that attempt to access communications between the client application (e.g., the workstations 106, 116 and/or 118) and the resource discovery server (e.g., the resource discovery servers 114a-c). Next, the example process 400 determines if the client application has requested an additional resource (block 432). If the client application has requested other resources, the client application sends a request for the resource to the resource discovery endpoint (block 428). In other examples, upon the client application selecting a resource (block 428), the example process 400 may transmit to the client application an identifier for the selected resource (block 430). Then, upon receiving the identifier, the client application communicates with the resource discovery server using the identifier.

If the client application does not select additional resources to register (block 432), the example process 400 determines if the client application has requested to create and/or open a read, write, and/or subscribe endpoint (block 434). If the client application does not request to create and/or open an endpoint, the example process 400 determines if the client application requests an assignment of the one or more resources to an already created endpoint (block 442).

However, if the client application requests to create and/or open a read, write, and/or subscribe endpoint (block 434), the client application sends a request to create and/or open the endpoint. When the example process 400 receives the request, the example process 400 processes the request by determining if the client application is authorized to create and/or open the endpoint based on security criteria (block 436). The security criteria may include an identity and/or job function of the requester, a network address of the requesting workstation and/or computer, an identity and/or type of the client application, protocols used by the client application to access the resource discovery endpoint, and/or a time that the request was received by the endpoint. If the example process 400 authorizes the client application, the example method 400 creates and/or opens the requested endpoint and transmits an associated identifier(s) to the client application (block 438). The identifier(s) may be specific to the session and known only to the resource discovery endpoint and the client application.

Next, the example process 400 determines if the client application has requested to create and/or open another read, write, and/or subscribe endpoint (block 440). If the client application has requested an additional endpoint, the example process 400 processes the request (block 436). In some examples, the client application may be authorized to select resources and assign those resources to read endpoints, write endpoints, and/or subscribe endpoints. In these cases, the example process 400 determines if the client application has requested an assignment of one or more resources to the requested read, write, and/or subscribe endpoint (block 442). If the client application has requested an assignment of one or more resources, the example process 400 processes the request by authorizing the request and assigning the selected resources to the requested opened and/or created endpoint (block 444). The example process 400 then provides and/or grants access via the identifier(s) to the selected resources until the client application requests to terminate the session (block 446). Additionally, if the client application has not requested an assignment of one or more resources (block 442), the example process 400 provides and/or grants access to the resources via the identifier(s) (block 446). Further, the client application may submit additional requests as described in block 428, 434, and/or 442 while the session is open. Upon receiving a request to terminate the session, the example process terminates the session and access to the endpoints and associated resources (block 448). The example process 400 then ends.

Figure 5:
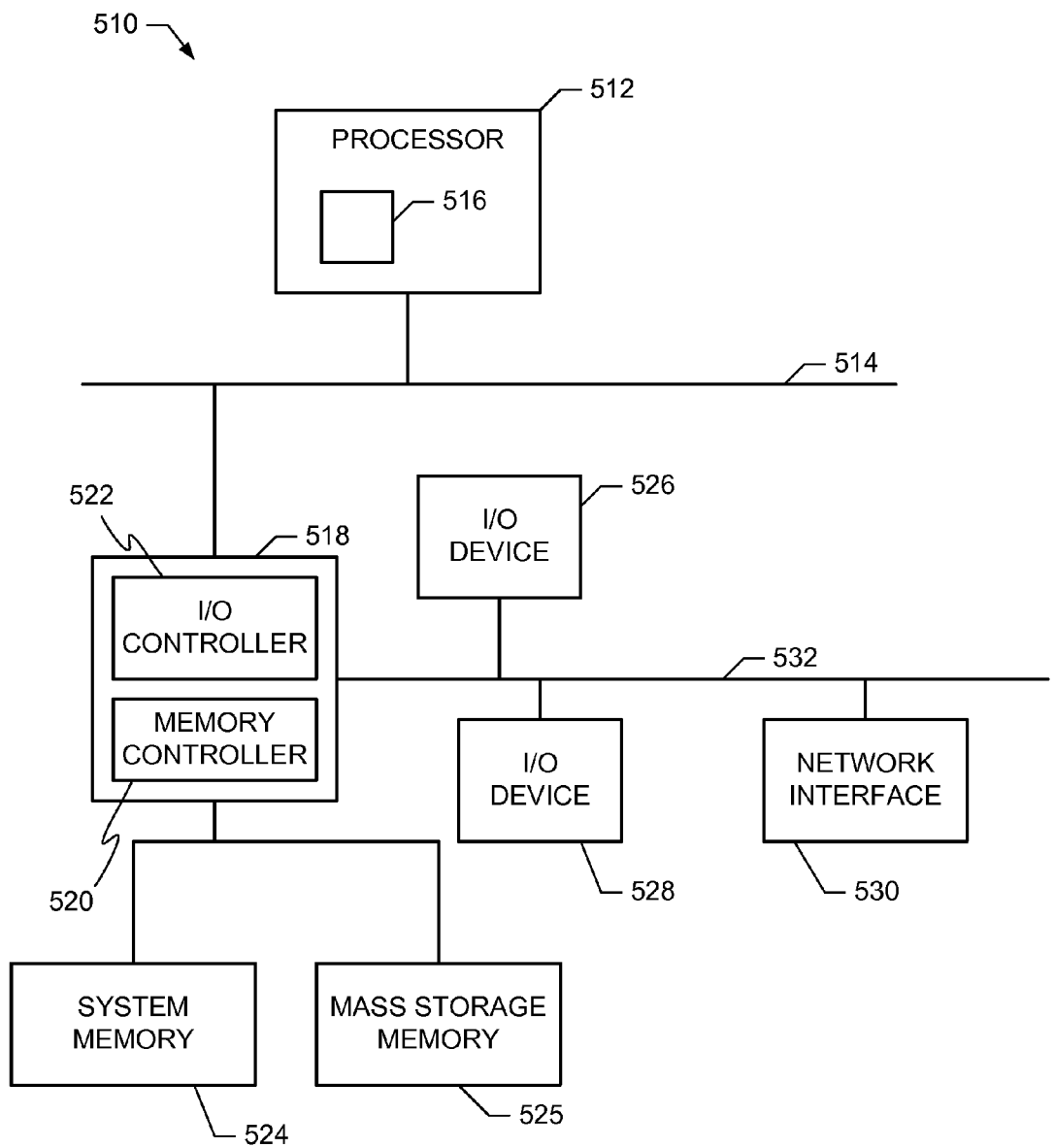
FIG. 5 is a block diagram of an example processor system that may be used to implement the example methods and apparatus described herein.

FIG. 5 is a block diagram of an example processor system 500 that may be used to implement the example methods and apparatus described herein. For example, processor systems similar or identical to the example processor system 500 may be used to implement the example server discover server 108, the example resource discover servers 114a-c, the example client application 202, the example security processors 204a-b, the example server discovery endpoint processor 206, the resource discovery endpoint processor 210, and/or the read/write/subscribe endpoint processor 212 of FIGS. 1 and/or 2. Although the example processor system 500 is described below as including a plurality of peripherals, interfaces, chips, memories, etc., one or more of those elements may be omitted from other example processor systems used to implement one or more of the example server discover server 108, the example resource discover servers 114a-c, the example client application 202, the example security processors 204a-b, the example server discovery endpoint processor 206, the resource discovery endpoint processor 210, and/or the read/write/subscribe endpoint processor 212.

As shown in FIG. 5, the processor system 500 includes a processor 512 that is coupled to an interconnection bus 514. The processor 512 includes a register set or register space 516, which is depicted in FIG. 5 as being entirely on-chip, but which could alternatively be located entirely or partially off-chip and directly coupled to the processor 512 via dedicated electrical connections and/or via the interconnection bus 514.

The processor 512 may be any suitable processor, processing unit or microprocessor. Although not shown in FIG. 5, the system 500 may be a multi-processor system and, thus, may include one or more additional processors that are identical or similar to the processor 512 and that are communicatively coupled to the interconnection bus 514.

The processor 512 of FIG. 5 is coupled to a chipset 518, which includes a memory controller 520 and a peripheral input/output (I/O) controller 522. As is well known, a chipset typically provides I/O and memory management functions as well as a plurality of general purpose and/or special purpose registers, timers, etc. that are accessible or used by one or more processors coupled to the chipset 518. The memory controller 520 performs functions that enable the processor 512 (or processors if there are multiple processors) to access a system memory 524 and a mass storage memory 525.

The system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device. For example, if the example processor system 500 is used to implement the server discovery server 108 and/or the resource discovery server 114a (FIG. 1), the mass storage memory 525 may include a hard disk drive, an optical drive, a tape storage device, etc. Alternatively, if the example processor system 500 is used to implement the access control database 220, the mass storage memory 525 may include a solid-state memory (e.g., a flash memory, a RAM memory, etc.), a magnetic memory (e.g., a hard drive), or any other memory suitable for mass storage in the access control database 220.

The peripheral I/O controller 522 performs functions that enable the processor 512 to communicate with peripheral input/output (I/O) devices 526 and 528 and a network interface 530 via a peripheral I/O bus 532. The I/O devices 526 and 528 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 530 may be, for example, an Ethernet device, an asynchronous transfer mode (ATM) device, an 802.11 device, a DSL modem, a cable modem, a cellular modem, etc. that enables the processor system 500 to communicate with another processor system.

While the memory controller 520 and the I/O controller 522 are depicted in FIG. 5 as separate functional blocks within the chipset 518, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to provide layered security for interface access control, the method comprising:
   receiving a connect message in a first server from a client application to access at least one server endpoint;
   in response to receiving the connect message, opening a session between the at least one server endpoint and the client application if the session is authorized to be opened;
   receiving a request for a type of access from a plurality of types of access including a first type of access and a second type of access from the client application to open an endpoint to provide the type of access requested to at least one resource;
   opening a first endpoint dedicated to the first type of access within the open session after determining that the client application is authorized to access the at least one resource via the first endpoint, the first endpoint to provide the first type of access to the at least one resource;
   opening a second endpoint dedicated to the second type of access within the open session after determining that the client application is authorized to access the at least one resource via the second endpoint, the second endpoint to provide the second type of access to the at least one resource, wherein the first endpoint and the second endpoint are distinct;
receiving a request from the client application to assign a selection of the at least one resource to the first and second opened endpoints;
assigning the at least one resource to the first and second endpoints;
granting the client application access to the at least one resource via the first opened endpoint to provide the first type of access; and
granting the client application access to the at least one resource via the second opened endpoint to provide the second type of access requested, wherein the first and second endpoints are accessed concurrently when the client application is authorized access.

2. A method as defined in claim 1, further comprising providing the client application with a list of the at least one resource if the at least one resource is authorized to be accessed by the client application.

3. A method as defined in claim 2, wherein providing the client application with the list of the at least one resource is in response to receiving a find resource request message in the first server from the client application to discover the at least one resource.

4. A method as defined in claim 1, wherein the one of the first or second endpoints is opened in response to receiving an open endpoint request message in the first server from the client application.

5. A method as defined in claim 1, wherein opening the first endpoint includes at least one of selecting the first endpoint or creating the first endpoint.

6. A method as defined in claim 1, further comprising:
prior to receiving the connect message in the first server, receiving a discover server request message in a second server from the client application to discover the at least one server endpoint of the first server;
in response to receiving the discover server request message, determining the at least one server endpoint that is authorized to be accessed by the client application; and
providing the at least one determined server endpoint to the client application.

7. A method as defined in claim 6, wherein determining if the client application is authorized to access at least one of the at least one server endpoint or the at least one resource includes authorizing the client application via an access control list that validates at least one of a workstation network address of the client application, an identity of a user of the client application, a location of a workstation of the client application, an identity of the client application, or a protocol used by the client application.

8. A method as defined in claim 1, further comprising:
assigning at least one of an identifier or a pair of identifiers to the at least one selected resource;
associating the at least one of the identifier or the pair of identifiers with the session; and
transmitting the at least one of the identifier or the pair of identifiers to the client application.

9. A method as defined in claim 8, wherein the identifier is a dynamically assigned aliased identifier that protects the at least one resource identified by the identifier from being determined by a third party.

10. A method as defined in claim 1, further comprising terminating the session after at least one of a time period or a termination request message from the client application to terminate the session.

11. A method as defined in claim 1, further comprising:
receiving information from the client application via one or more of the first or second endpoints; and
storing the information to the corresponding to the at least one resource via one or more of the first or second endpoints.

12. A method as defined in claim 11, wherein the information includes at least one of data or a request to perform an action.

13. A method as defined in claim 1, further comprising sending at least one of data, events, or alarms to the client application via one or more of the first or second endpoints.

14. A method as defined in claim 1, wherein the at least one resource includes at least one of data, an alarm, or an event.

15. A method as defined in claim 1, further comprising if the at least one resource is not authorized to be accessed by the client application, denying the client application access to the at least one resource that is available via the first or second server endpoint.

16. A method as defined in claim 1, wherein opening the second endpoint includes at least one of selecting the second endpoint or creating the second endpoint.

17. An apparatus to provide layered security for interface access control, the apparatus comprising:
a first server programmed to:
receive a connect message from a client application to access at least one server endpoint;
in response to receiving the connect message, open a session between the at least one server endpoint and the client application if the session is authorized to be opened;
receive a request identifying one of a read access, or a write access-from the client application to open an endpoint to provide the type of access requested to at least one resource;
in response to receiving the request for the read access, open a first endpoint dedicated to the read access to provide the read access to the at least one resource via the first endpoint after determining that the client application is authorized to access the at least one resource via the first endpoint;
in response to receiving the request for the write access, open a second endpoint dedicated to a write access to provide the write access to the at least one resource via the second endpoint after determining that the client application is authorized to access the at least one resource via the second endpoint, wherein the first endpoint and the second endpoint are distinct;
receive a request from the client application to assign a selection of the at least one resource to the first and second opened endpoints;
assign the at least one resource to the first and second opened endpoints;
grant the client application access to the at least one resource via the first opened endpoint to provide the read access requested; and
grant the client application access to the at least one resource via the second opened endpoint to provide the write access requested, wherein the first and second endpoints are accessed concurrently when the client application is authorized access.

18. An apparatus as defined in claim 17, wherein the first server is to provide the client application with a list of the at least one resource if the at least one resource is authorized to be accessed by the client application.

19. An apparatus as defined in claim 18, wherein the first server is to provide the client application with the list of the at least one resource in response to receiving a find resource request message from the client application to discover the at least one resource.

20. An apparatus as defined in claim 17, wherein the first server is to open one of the first or second endpoints in response to receiving a create endpoint request message in the first server from the client application.

21. An apparatus as defined in claim 17, wherein the apparatus further comprises a second server to:
   receive a discover server request message from the client application to discover the at least one server endpoint of the first server;
   in response to receiving the discover server request message, determine the at least one server endpoint that is authorized to be accessed by the client application; and
   provide the at least one determined server endpoint to the client application.

22. An apparatus as defined in claim 17, wherein the first server is to determine if the client application is authorized to access the at least one resource by authorizing the client application via an access control list that validates at least one of a workstation network address of the client application, an identity of a user of the client application, a location of a workstation of the client application, an identity of the client application, or a protocol used by the client application.

23. An apparatus as defined in claim 17, wherein the first server is to:
   assign at least one of an identifier or a pair of identifiers to the at least one resource;
   associate the at least one of the identifier or the pair of identifiers with the session; and
   transmit the at least one of the identifier or the pair of identifiers to the client application.

24. An apparatus as defined in claim 17, wherein the first server is to:
   receive information from the client application via one or more of the first or second endpoints; and
   store the information to the corresponding to the at least one resource via one or more of the first or second endpoints.

25. An apparatus as defined in claim 17, wherein the first server is to send at least one of data, events, or alarms to the client application via one or more of the first or second endpoints.

26. An apparatus as defined in claim 17, wherein if the at least one resource is not authorized to be accessed by the client application, the first server is to deny the client application access to the at least one resource that is available via the server endpoint.

27. A tangible storage device or storage disk having instructions stored thereon that, when executed, cause a machine to:
   receive a connect message in a first server from a client application to access a first server endpoint;
   open a connection between the first server endpoint and a second server endpoint;
   in response to receiving the connect message, open a session between the second server endpoint and the client application if the session is authorized to be opened;
   receive a request at the second server endpoint for access from the client application to open endpoints to provide the type of access requested from a plurality of types of access including a first type of access and a second type of access to at least one resource, wherein endpoints dedicated to different types of access are distinct;
   open the first endpoint dedicated to the first type of access requested within the open session to provide the first type of access requested to the at least one resource via the first endpoint after determining that the client application is authorized to access the at least one resource via the first endpoint;
   open the second endpoint dedicated to the second type of access requested within the open session to provide the second type of access requested to the at least one resource via the second endpoint after determining that the client application is authorized to access the at least one resource via the first endpoint;
   receive a request from the client application to assign a selection of the at least one resource to the first and second endpoints;
   assign the at least one resource to the first and second endpoints;
   grant the client application access to the at least one resource via the first endpoint to provide the first type of access requested; and
   grant the client application access to the at least one resource via the second endpoint to provide the second type of access requested, wherein the first and second endpoints are accessed concurrently when the client application is authorized access.

28. A method to provide layered security for interface access control, the method comprising:
   receiving a first request from a client application for a first type of access to at least one resource from a client application;
   receiving a second request from the client application for a second type of access to the at least one resource from the client application;
   opening a first end point dedicated to the first type of access within a session after verifying authorization of the client application to access the at least one resource using the first type of access;
   opening a second end point dedicated to the second type of access within the session after verifying authorization of the client application to access the at least one resource using the second type of access; and
   granting the client application access to the at least one resource via the first and second endpoints, the first and second endpoints to be accessed concurrently.

29. A method as defined in 28, further comprising:
   receiving information from the client application via one or more of the first or second endpoints; and
   storing the information to the corresponding to the least one selected resource via one or more of the first or second endpoints.

30. The method as defined in claim 28, further comprising:
   assigning at least one of an identifier or a pair of identifiers to the at least one resource;
   associating the at least one of the identifier or the pair of identifiers with the session; and
   transmitting the at least one of the identifier or the pair of identifiers to the client application.

31. An apparatus to provide layered security for interface access control, the apparatus comprising:
   a server programmed to:
      open a session between at least one server endpoint and a client application if the session is authorized to be opened;
      receive a request from the client application to open an endpoint to provide a first type of access requested to at least one resource;
      receive a request from the client application to open an endpoint to provide a second type of access requested to the at least one resource;

in response to receiving the request for the first and second types of access, open a first endpoint dedicated to a first type of access and open a second endpoint dedicated to a second type of access after verifying authorization of the client application to the at least one resource, wherein the first and second endpoints are distinct;

grant the client application access to the types of access requested of the at least one resource via the first opened and second endpoints concurrently.

32. An apparatus as defined in claim 31, wherein the server is to provide the client application with a list of the at least one resource if the at least one resource is authorized to be accessed by the client application.

33. An apparatus as defined in claim 32, wherein the server is to provide the client application with the list of the at least one resource in response to receiving a find resource request message from the client application to discover the at least one resource.

* * * * *